United States Patent [19]

Sakurai et al.

[11] Patent Number: 4,796,032
[45] Date of Patent: Jan. 3, 1989

[54] SATELLITE BROADCASTING RECEIVING SYSTEM

[75] Inventors: Masaru Sakurai; Hiroshi Matsue; Kazuhiro Aoki, all of Yokohama, Japan

[73] Assignee: Kabushiki Kaisha Toshiba, Kawasaki, Japan

[21] Appl. No.: 843,680

[22] Filed: Mar. 25, 1986

[30] Foreign Application Priority Data

Mar. 25, 1985 [JP] Japan .................................. 60-58183
Aug. 26, 1985 [JP] Japan .................................. 60-185850

[51] Int. Cl.⁴ .............................................. H01Q 3/02
[52] U.S. Cl. .................................. 342/359; 342/352; 342/356
[58] Field of Search ........ 342/359, 352, 356, 362-364; 343/765, 766

[56] References Cited

U.S. PATENT DOCUMENTS

| | | | |
|---|---|---|---|
| 3,945,015 | 3/1976 | Gueguer | 343/765 |
| 4,352,202 | 9/1982 | Carney . | |
| 4,496,890 | 1/1985 | Wurdack et al. . | |
| 4,538,175 | 8/1985 | Balbes et al. . | |
| 4,602,259 | 7/1986 | Shepard | 343/882 |

FOREIGN PATENT DOCUMENTS

| | | | |
|---|---|---|---|
| WO83/03243 | 9/1983 | European Pat. Off. . | |
| 5096703 | 7/1980 | Japan . | |
| 2903819 | 8/1980 | Japan | 343/766 |
| 56-41401 | 9/1981 | Japan . | |
| 0115003 | 9/1981 | Japan | 343/766 |
| 60-29244 | 7/1985 | Japan . | |
| 2033179 | 5/1980 | United Kingdom | 343/766 |

OTHER PUBLICATIONS

Patent Abstracts of Japan, vol. 7, No. 251 (E-209)[1396], 8th Nov. 1983; & JP-A-58 137 383 (Matsushita Denki Sangyo K.K.) 15-08-1983.
Adv. fror STU at Jan. 1985.

Primary Examiner—Theodore M. Blum
Assistant Examiner—Mark Hellner
Attorney, Agent, or Firm—Cushman, Darby & Cushman

[57] ABSTRACT

In the storing mode, an operator section is operated to direct a parabolic antenna toward a broadcasting satellite and to select a desired channel. After the desired channel is seized, a predetermined label is input from a label input part. The satellite position and the selected channel are stored in a memory with the label attached thereto. When a search operation is performed, the direction of the antenna is gradually adjusted. Whenever the direction of the antenna is adjusted, the receiving frequency is scanned to receive each channel. When a signal is received by the frequency scanning, the type of the satellite is recognized depending on the odd or even group of channels and on whether the antenna is set to horizontally or vertically polarized wave reception. The type of the satellite as recognized, the antenna direction at that time, and the desired receiving channel transmitted from the satellite are stored into memory with a given label attached thereto. In the viewing mode, the stored label is designated and read out from the memory through the label input part. The antenna is directed toward a specific satellite to receive a desired channel, and is also put into a receiving state to receive the predetermined horizontally or vertically polarized wave.

15 Claims, 11 Drawing Sheets

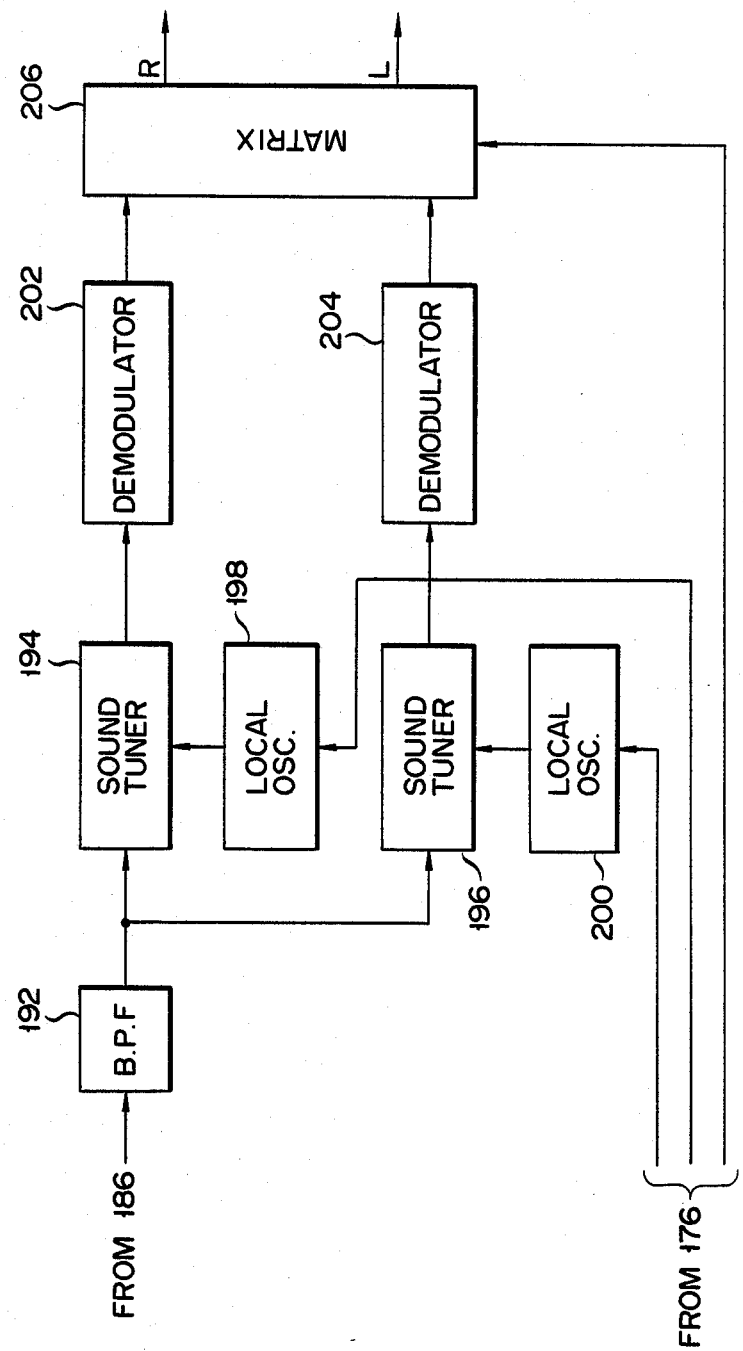
F I G. 5

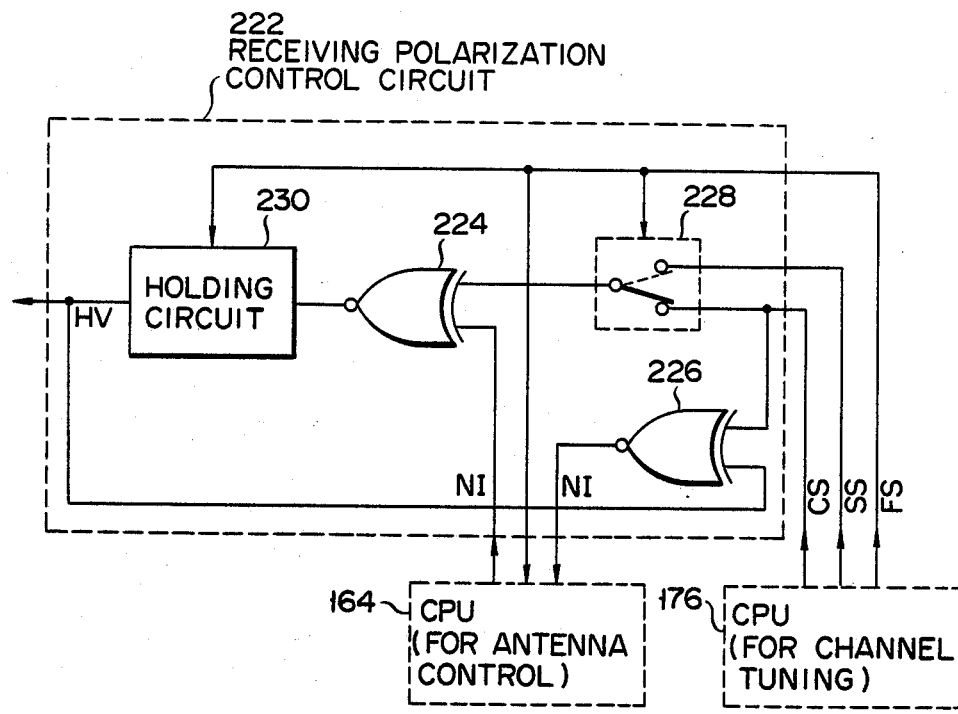
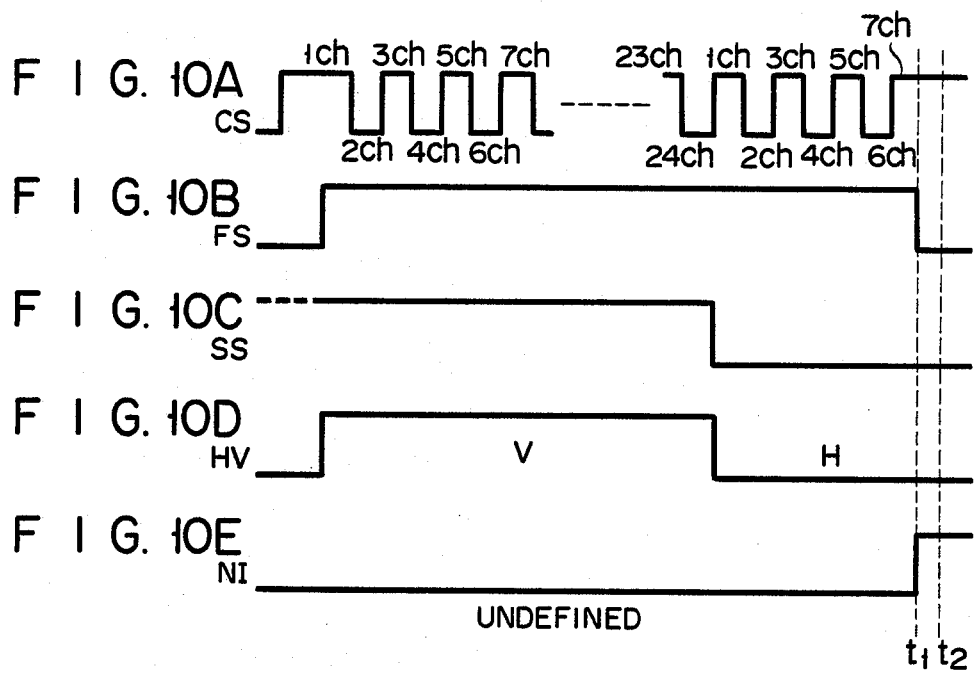

FIG. 13
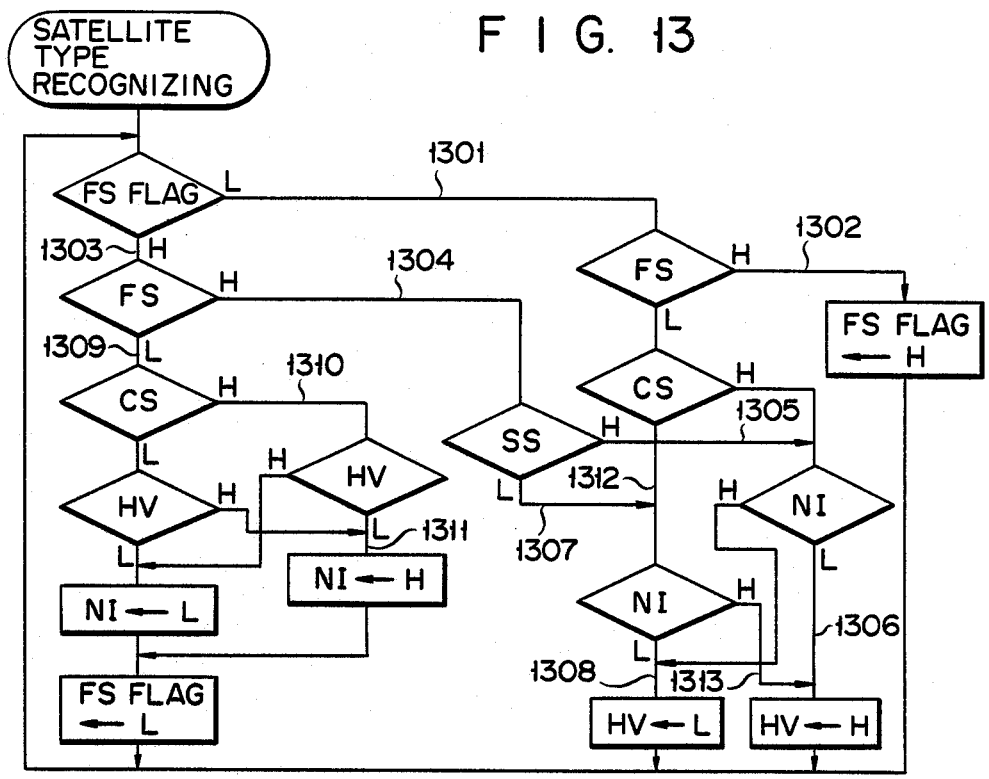
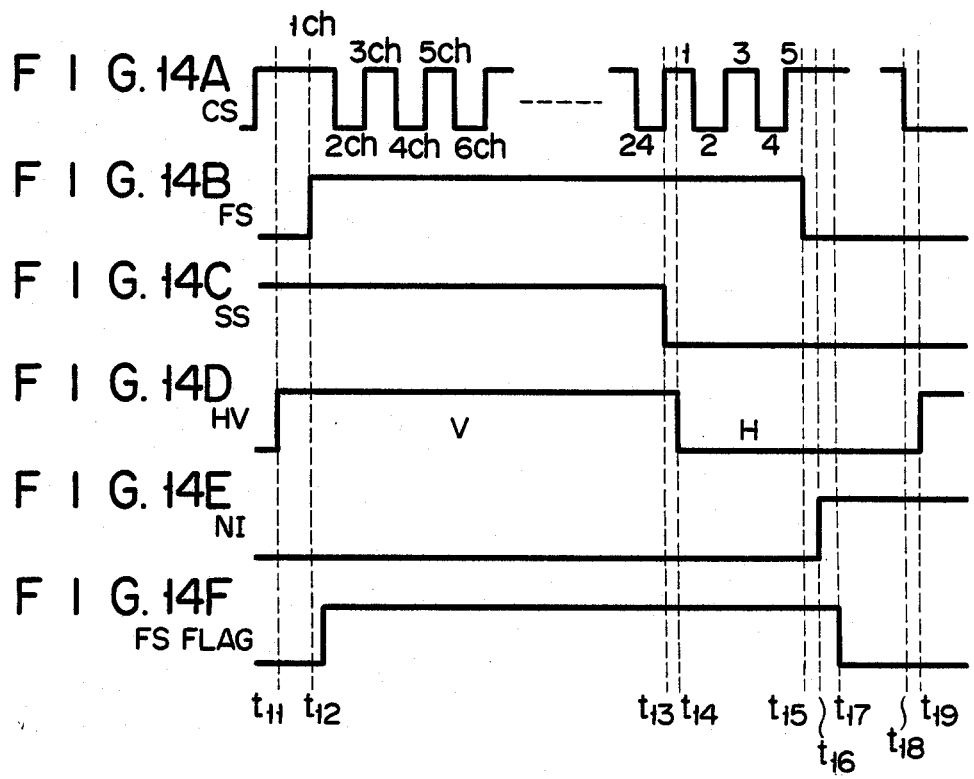

FIG. 15
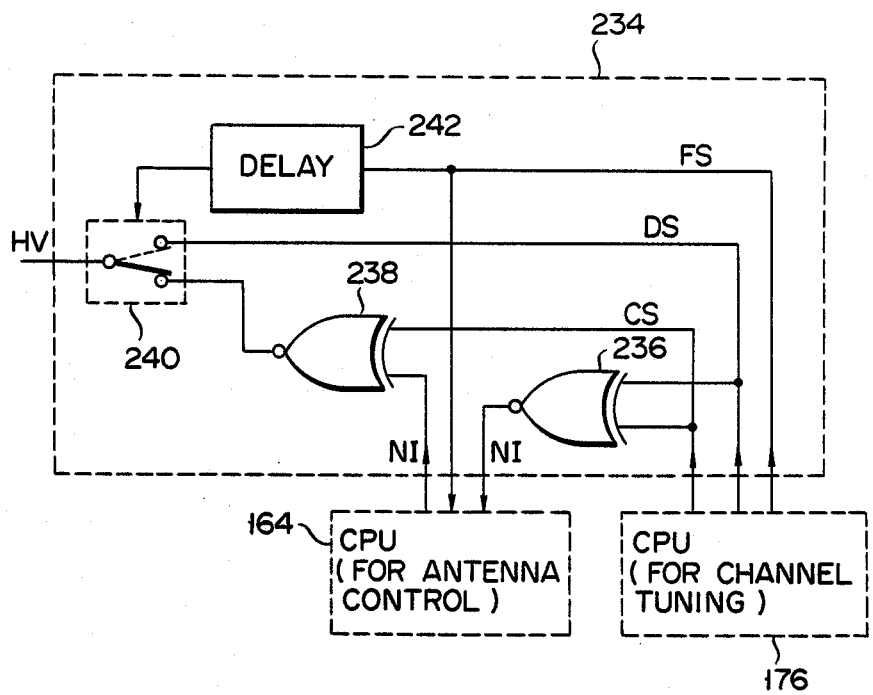
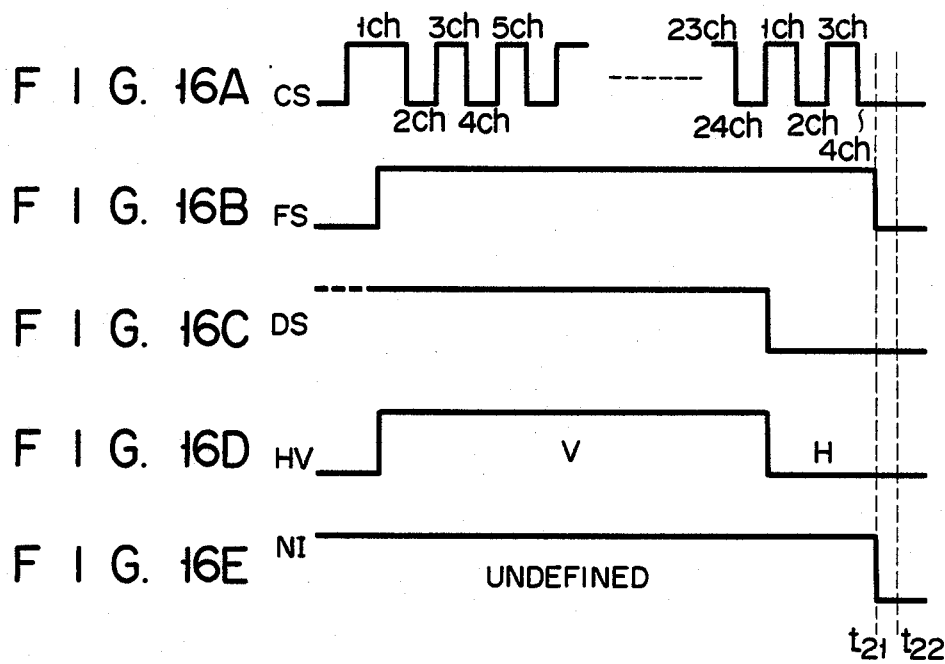
FIG. 16A CS
FIG. 16B FS
FIG. 16C DS
FIG. 16D HV
FIG. 16E NI

SATELLITE BROADCASTING RECEIVING SYSTEM

BACKGROUND OF THE INVENTION

This invention relates to a satellite broadcasting receiving system in which for viewing a desired program viewers on the ground directly receive, by parabolic antennas, the television waves which are radiated from an artificial satellite toward the earth.

In recent days, a satellite broadcasting receiving system has been developed and put into practical use in many countries in the world. In this system, an artificial satellite radiates television waves toward the earth, while viewers on the ground receive the waves through parabolic antennas. Generally, in this system a plurality of the artificial satellites for broadcasting are in such a geostationary satellite orbit that the viewers can continuously receive the radiated television waves. To receive the waves from all of the satellites, however, the viewer must direct the antenna toward each satellite. One satellite station normally has a plurality of channels (for example, 24 channels in U.S.A.) In this broadcasting system, for receiving a desired channel, the viewer first directs the antenna toward the satellite which is radiating the waves containing such a channel and then selects the desired channel from among the received waves.

Thus, for viewing a desired television program in the satellite broadcasting receiving system, the viewer must take two steps for reception: directing of the antenna and selecting of the desired channel. The directing operation of the antenna is done mechanically, while the channel selection is achieved by an electrical process. For this reason, mechanical and electrical systems are separately provided in the television set such steps for channel selection require much time and labor.

To avoid interference among the channels, the channels are classified into two groups, an odd numbered group and an even numbered group. The waves of these groups of channels are radiated with different polarizations. In a normal satellite, the horizontally and vertically polarized electromagnetic waves are used for transmitting the even and odd numbered groups of channels, respectively. In an inverse satellite, the even numbered channels are transmitted by the vertical polarization, and the odd numbered channels by the horizontal polarization. When the adjacent satellites are closely put on the oribt, the normal and inverse satellites are alternately put on the orbit. Thus, the viewer must recognize the type of satellite for his channel selection. Specifically, in selecting a desired channel, the viewer must recognize a type of satellite radiating the desired channel wave and then decide if the channel group containing the desired channel is an even or odd numbered one. Finally, he sets the plane of the polarization of the waves input to the converter of the antenna to the horizontally polarized wave (H) or the vertically polarized wave (V). That is, he operates a normal/inverse switch for such selection.

There is a case that the satellite does not use some channels for its TV wave transmission. In such a case, if the TV program of the channel as selected by the viewer is not broadcasted, he must check if the TV broadcasting through the selected channel is being performed or whether the selection by the normal/reverse switch is wrong. This check makes the channel selection further complicated.

The base-band signal transmitted by the satellite usually contains the aural signals of two channels (channels A and B) in the frequency range 5 MHz to 8 MHz, which are attached to the visual signal. The signals of the channels A and B take one of the following three modes:

(i) Monaural mode; Audio signals are independently carried on these channels A and B.

(ii) Independent stereo mode; L and R signals of stereo are carried on the these channels.

(iii) Matrix stereo mode; L+R and L−R signals of stereo are carried on these channels.

The types of these modes and the frequencies of the channels A and B depend on satellites and channel numbers. Therefore, every time the satellite and the channel are changed to other ones, the viewer must reset these items.

As described above, for selecting a desired program in the satellite broadcasting system, the viewer directs the antenna toward a specific satellite, selects a channel carrying the desired program, operates the normal/inverse switch, and finally sets the sound mode. Such a channel selecting operation of many steps is troublesome and inconvenient for viewers.

SUMMARY OF THE INVENTION

The present invention is contrived in consideration of these circumstances and is aimed at providing a satellite broadcasting receiving system which can concurrently adjust the directing of an antenna and the selection of a desired channel in a simple manner.

The present invention is further aimed at providing a satellite broadcasting receiving system which can automatically check if the target satellite is of the normal type or the inverse type, and it enables the viewer to view a desired program without knowledge of the types of the satellites.

To achieve the above objects, there is provided a satellite broadcasting receiving system for receiving broadcasting waves from a plurality of satellites with a plurality of channels arranged on geostationary satellite orbits for broadcasting viewing purposes, the receiving system comprising: an antenna for receiving the satellite broadcasting waves; means for adjusting the antenna direction so as to receive the satellite broadcasting waves from a specific satellite; means for reproducing a signal of a specific channel from the specific satellite as received by the antenna; memory means for storing the position data of a satellite corresponding to the specific direction of the antenna and channel select data corresponding to the reproduced signal; operating means including a selecting section for selecting the directioning of the antenna and the channel, a requesting section for requesting the storage of the position of a specific satellite and the channel selection data to the memory means, and a label input section for recognizing the channel of the specific satellite and requesting the viewing of the channel of the stored specific satellite; and control means for controlling the antenna direction adjusting means and the reproducing means according to the selection of the antenna direction and the channel as given by the operating means, storing the data on the position of the specific satellite and the data on channel selection into the memory means according to the request of such data storage by the operating means, and reading out of the memory means the stored data on the specific satellite position and channel selection data according to the specific satellite channel viewing request by the operating means, and controlling the antenna direction adjusting means and the reproducing means.

BRIEF DESCRIPTION OF THE DRAWINGS

FIG. 5 is a block diagram of a detailed circuit arrangment of a sound processing circuit of the IDU;

FIG. 9 shows a circuit diagram of a detailed arrangement of a receiving polarization control circuit forming a receiving polarization control section of the IDU;

FIGS. 10A to 10E show a timing chart useful in explaining the operation of the circuit of FIG. 9;

FIG. 13 shows a flowchart illustrating a control flow when the function of the FIG. 9 circuit is implemented by a CPU for antenna control;

FIGS. 14A to 14F show a timing chart useful in explaining the control flow as illustrated by the flow chart of FIG. 13;

FIG. 15 is a circuit diagram of another arrangement of the receiving polarization control circuit; and FIGS. 16A to 16E show a timing chart for explaining the operation of the FIG. 15 circuit.

DETAILED DESCRIPTION OF THE PREFERRED EMBODIMENTS

One embodiment of the present invention will now be described in detail with reference to the accompanying drawings.

Figure 1:
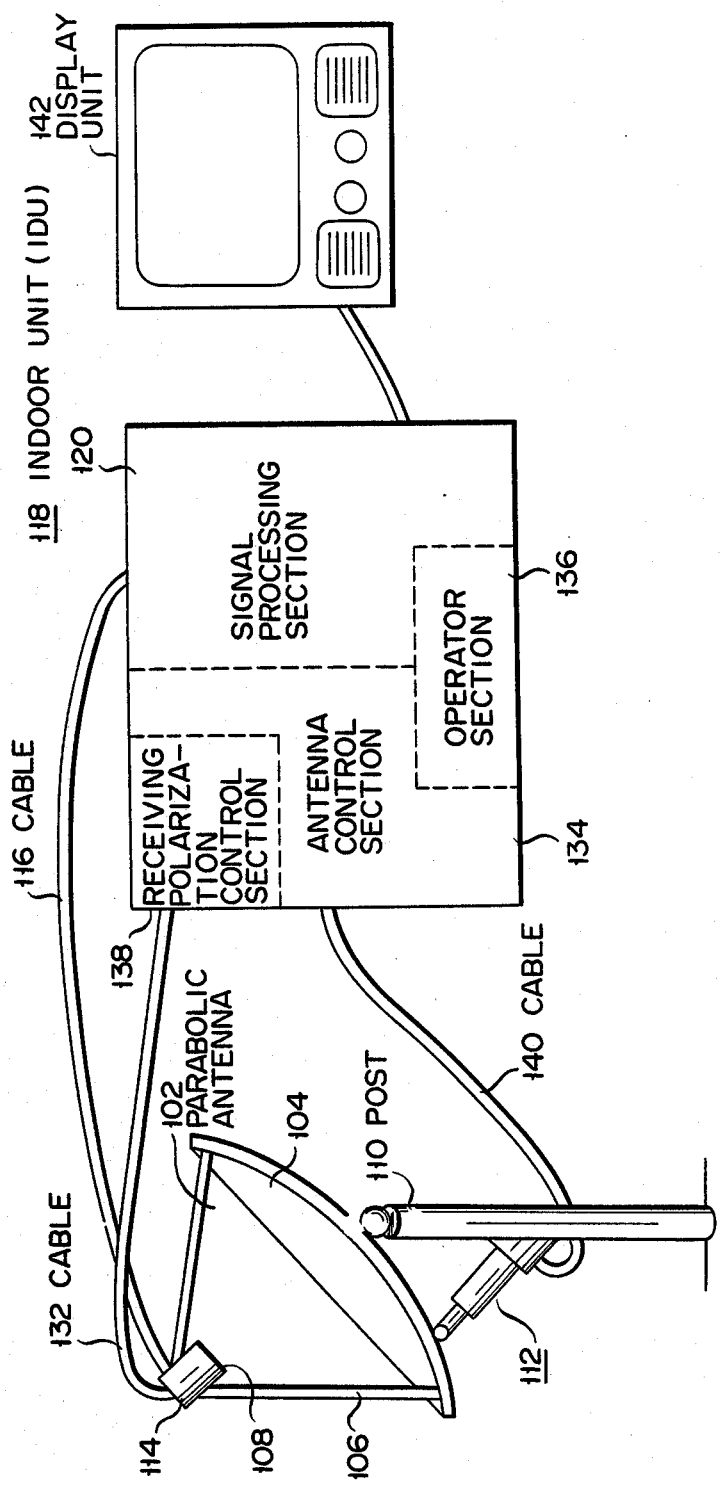
FIG. 1 shows a diagram illustrating an overall system of a satellite broadcasting receiving system according to an embodiment of the present invention.

FIG. 1 illustrates an overall arrangement of a satellite broadcasting receiving system according to an embodiment of the present invention. Parabolic antenna 102 directly receives TV waves radiated by an artificial satellite toward the earth. Antenna 102 includes reflecting plate 104 with a parabolic surface and primary radiator 108 which is disposed in front of the parabolic antenna and supported and held by holding member 106. Antenna 102 is rotatably mounted to post 110 and rotatable in both the azimuthal and elevational directions.

To accurately direct antenna 102 toward a satellite circulating on a geostationary orbit, strictly, the direction of the antenna must be adjusted in both the azimuthal and elevational directions. Practically, however, a satisfactory reception of the TV waves can be obtained by merely adjusting the antenna direction along the orbit in a predetermined direction. The antenna angle can be adjusted by means of actuator 112 with an extensible actuating rod which is located between post 110 and the lower side of parabolic antenna 102.

A TV wave received by primary radiator 108 enters outdoor unit (ODU) 114 which is connected to the radiator 108. In ODU 114, the waves pass through a high frequency amplifier and a first frequency converter. The amplified and frequency converted TV signal is then guided by cable 116 to the signal processing unit 120 in indoor unit (IDU) 118. The satellite broadcasting receiving system is thus comprised of ODU 114 and IDU 118.

Figure 2:
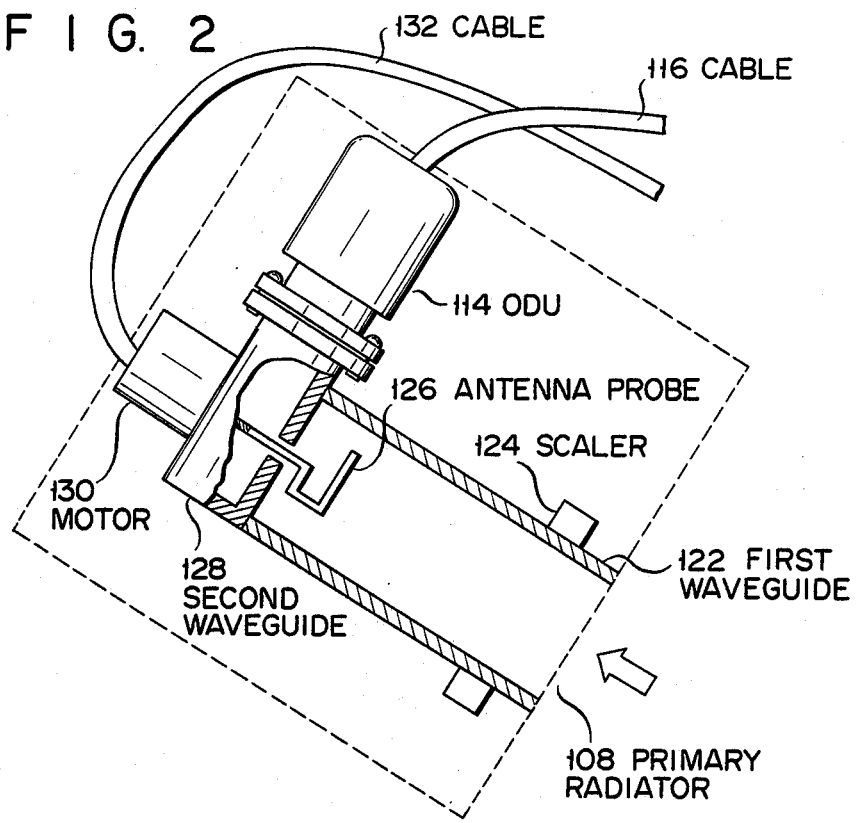
FIG. 2 shows a side view of a primary radiator and outdoor unit (ODU) used in the system shown in FIG. 1, the view being partially illustrated in cross-sectional form.

The structures of primary radiator 108 and ODU 114 are as illustrated in FIG. 2, for example. As shown, primary radiator 108 is comprised of first waveguide 122, scaler 124, antenna probe 126, second waveguide 128, and servomotor 130. First waveguide 122 guides the wave reflected by reflecting plate 104 into the antenna probe 126. Scaler 124 for improving the efficiency of wave reception is provided around waveguide 122 and is located closer to the inlet of the waveguide. Antenna probe 126 passes through the end wall of waveguide 122, crosses second waveguide 128, and is coupled with servomotor 130. Second waveguide 128 guides the electrical signal from probe 126 in the form of an electric wave. Servomotor 130 rotates antenna probe 126 crossing second waveguide 128 to be ready for receiving the vertically or horizontally polarized wave. This motor 130 is controlled by IDU 118 through cable 132. ODU 114 is comprised of a waveguide section connecting to second waveguide 128 and a microwave circuit containing the high frequency amplifier and the first frequency converter. The microwave circuit amplifies and frequency converts the microwave signal from the waveguide section. The signal from the microwave circuit is then supplied through cable 116 to IDU 118.

IDU 118, as shown in FIG. 1, is comprised of signal processing section 120, antenna control section 134, operator section 136, and receiving polarization control section 138. The antenna control section 134 sends a control signal through cable 140 to actuator 112 and detects an extension of the actuator rod of actuator 112, viz. an inclination of parabolic antenna 102. Operator section 136 has a control panel with a number of controls for manual operation, as will be described later. Receiving polarization control section 138 is connected through cable 132 to primary radiator 108.

Signal processing section 120 processes the received signal as will be described later. The video and audio signals are supplied to display unit 142 connected to IDU 118, and the satellite TV signal is visually and aurally reproduced by the display unit.

Figure 3:
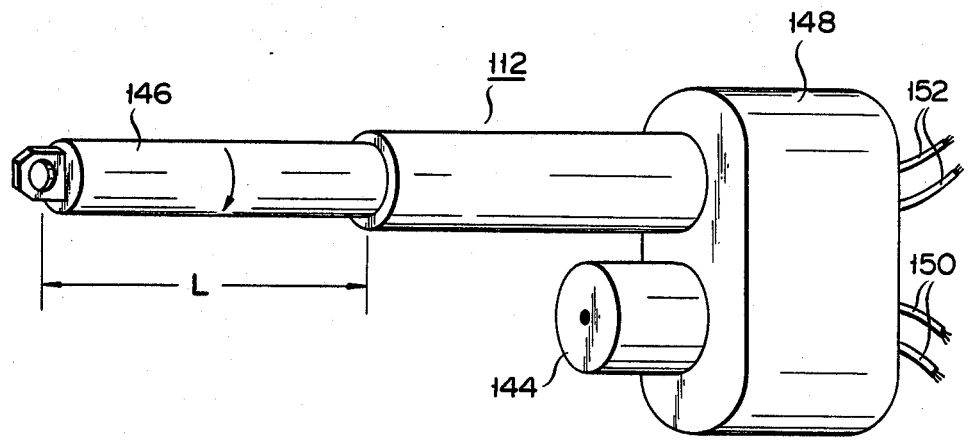
FIG. 3 shows a perspective view of an actuator used in the system shown in FIG. 1.

FIG. 3 shows the appearance of actuator 112 used in the system shown in FIG. 1. Actuator 112 is comprised of DC motor 144, extensible rod 146, and base holder 148. DC motor 144 is a reversible motor which can rotate in the forward or reverse direction according to the polarity of the applied voltage. Motor 144 drives actuator rod 146 to control its extension. Base 148 fixedly holds rod 146 and motor 144. DC voltage applied to motor 144 is supplied from antenna control section 134 of IDU 118 by motor drive line 150. The number of rotations of DC motor 144 is led in the form of pulses to control section 134 by means of pulse sensing line 152. Motor drive line 150 and pulse sensing line 152 are gathered in cable 140 as shown in FIG. 1. Conversion of the number of rotatons of the motor into the number of pulses is performed by the combination of a magnet mounted to the rotating shaft of motor 144 and a HALL sensor mounted to base 148. According to the direction and the number of rotations of motor 144, an extension, i.e., a length L, of rod 146 changes so that an inclination of parabolic antenna 102 changes. The length L of rod 146, i.e., the inclination of antenna 102, is electrically recognized in terms of an accumulated value of pulses led by sensing line 152.

Figure 4:
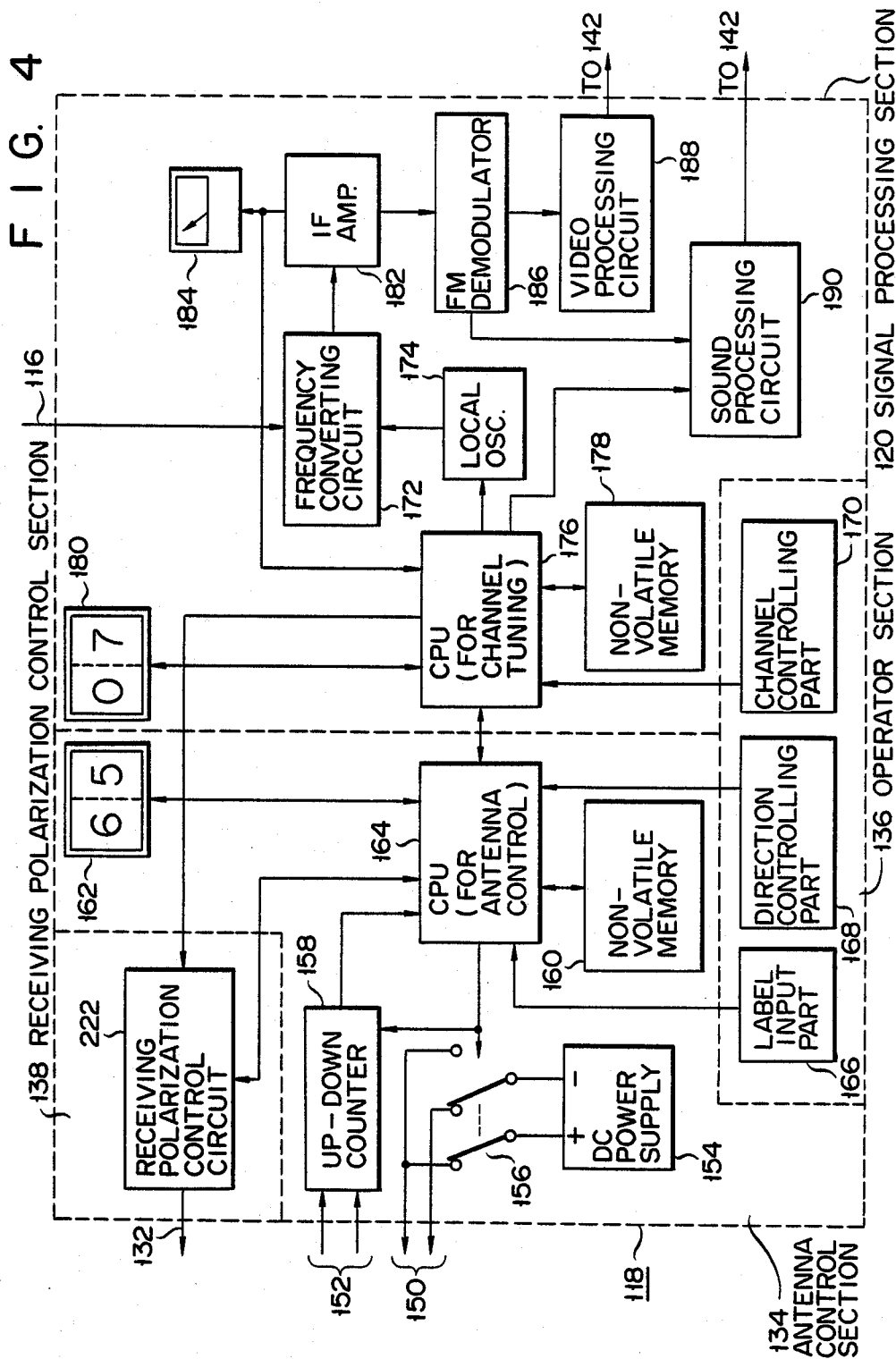
FIG. 4 is a block diagram of a detailed circuit arrangement of the indoor unit (IDU)

FIG. 4 shows a circuit arrangement of IDU 118. Antenna control section 134 includes DC power supply 154 for producing a DC voltage which is applied to motor 144 of actuator 112. The polarity of the DC voltage applied to DC motor 144 through motor drive line 150 is selected by relay 156. The number of pulses representing the number of rotations of motor, the which comes from motor 144 through pulse sensing line 152, is counted by up-down counter 158. The count of up-down counter 158 is stored into non-volatile memory 160 in a storing mode to be given later. The count of counter 158 is displayed by LED 162. CPU 164 for antenna control is provided for controlling actuation of relay 156, the counting direction of counter 158, and storing operation of the counted value by counter 158 into memory 160 as well as display by LED 162, and the like.

The operator section 136 of IDU 118 includes label input part 166 having a memory key (M) and ten keys. Label input part 166 is for inputting a desired label (any of numerals 0 to 9) in a storing mode and a label number representative of a desired channel in a viewing mode. Operator section 136 also contains direction controlling part 168 for giving the direction of antenna 102 and channel controlling part 170 for designating a desired channel to be given later.

In the signal processing section 120 of IDU 118, the signal from ODU 114 is supplied to frequency converting circuit 172 for converting the frequency of the signal into a second intermediate frequency. Circuit 172 is also supplied with a local oscillating signal from local oscillator 174. Local oscillator 174 is controlled by CPU 176 according to the designated channel signal derived from channel controlling part 170 of operator section 136. The channel signal from channel controlling part 170 is stored into memory 178 and displayed by LED 180, under control by CPU 176.

The intermediate frequency signal output from frequency converting circuit 172 is amplified by intermediate frequency (IF) amplifier 182. An automatic gain control (AGC) voltage in IF amplifier 182 is applied to signal meter 184 where it is indicated as a strength of the received signal. The signal amplified by amplifier 182 is demodulated by FM demodulator 186. The demodulated signal is applied to video processing circuit 188 and sound processing circuit 190 which in turn are produced in the form of reproduced video and sound signals. These signals are visually and aurally reproduced by display unit 142, which includes an audio system.

FIG. 5 shows a detailed arrangement of sound processing circuit 190. The base-band signal transmitted by the satellite usually contains the aural signals of two channels (channels A and B) in the frequency range 5 MHz to 8 MHz, which are attached to the visual carrier. Accordingly, the signal from FM demodulator 186 is passed through band-pass filter (BPF) 192 and input to two sound tuners 194 and 196 for selecting channels A and B. These tuners 194 and 196 are resepectively coupled with local oscillators 198 and 200. These oscillators are controlled by CPU 176 according to the directions by channel control part 170 in operator section 136. The signals as selected by tuners 194 and 196 are respectively demodulated by 202 and 204, and applied to matrix 206 which is also controlled by CPU 176. Upon receipt of these signals, matrix 206 produces L and R signals.

As noted earlier, the signals of the channels A and B take one of the following three modes:

(i) Monaural mode; Audio signals are independently carried on these channels A and B.

(ii) Independent stereo mode; L and R signals of stereo are carried on these channels.

(iii) Matrix stereo mode; L+R and L−R signals of stereo are carried on these channels.

The directions given by channel control part 170 of operation section 136 includes a change between monaural and stereo ((i) and (ii)) and a change between stereo and matrix stereo ((ii) and (iii)).

Receiving polarization control section 138 sends a control signal to motor 130 for rotating antenna probe 126 of primary radiator 108 in response to the directions from direction controlling part 168. By this control signal, a receiving mode of the parabolic antenna 102 is changed.

Figure 6:
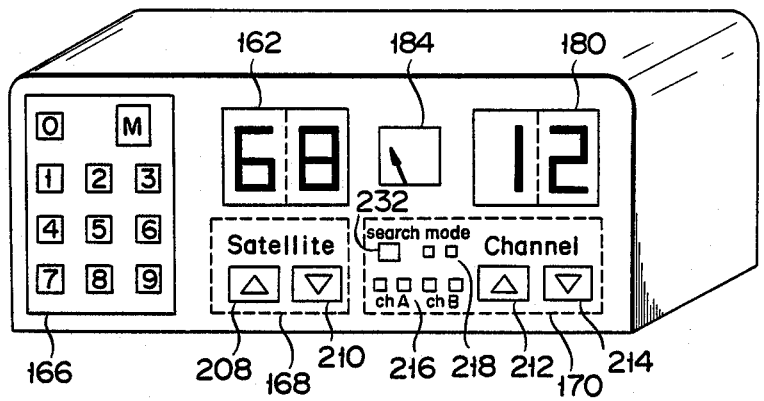
FIG. 6 is a perspective view illustrating the outer appearance of the IDU.

Turning now to FIG. 6, there is shown a front layout of IDU 118. As shown, LED 162 for displaying the number of pulses is disposed just above direction controlling part 168. Similarly, LED 180 for channel display is located just above channel controlling part 170. Label input part 166 and signal meter 184 are also disposed in a similar layout.

The operation of the satellite broadcasting receiving system thus arranged will be described. Before description of an actual operation, the system operation will be given when the up- and down-keys of direction control part 168 and channel controlling part 170 are depressed.

As a first step, a viewer pushes up-key 208 or down-key 210 in the direction control part 168 of operator section 136, to change the inclination of parabolic antenna 102. Upon depression of up-key 208, antenna control section 134 sets the contacts of relay 156 to the positions shown in FIG. 4 and holds his contact position. Under this condition, the output voltage of DC power supply 154 supplies to DC motor 144 a voltage with a polarity causing the forward rotation of the motor. With the forward rotation, rod 146 rotates in the direction of the arrow in FIG. 3, and the length "L" of the actuator rod is extended. As a result, parabolic antenna 102 is incrementally inclined.

A train of pulses representing the number of rotations of DC motor 144 are supplied to up-down counter 158 through pulse sensing line 152. CPU 164 then informs up-down counter 158 that up-key 208 of the direction controlling part 168 has been pushed. Accordingly, at this time, counter 158 counts the number of pulses in the up direction. The count of counter 158 is displayed by LED 162 for display the number of pulses under control of CPU 164. When up-key 208 of direction control part 168 is continuously pushed, antenna 102 increases its inclination. With the inclination increase, the numeral displayed by LED 162 increases.

When down-key 210 of direction control part 168 is continuously pushed, the contacts of relay 156 are made to contact with the other positions so that motor 144 is reversely rotated and actuator rod 146 is retracted to shorten its length L. Under this condition, up-down counter 158 counts pulses in the down direction so that the displayed numeral of LED 162 is progressively decreased. On the other hand, if neither the up- and down-keys 208 nor 210 is pushed, the contacts of the relay 156 are not set to the contact positions so that motor 144 is at a standstill. Thus, the displayed numerical value of LED 162 indicates the direction of parabolic antenna 102, and therefore the position of a target satellite.

Channel controlling part 170 is provided with up- and down-keys 212 and 214. When the up-key 212 is pushed by a viewer, the channel number displayed by LED 180 is successively increased from "1". At this time, the channel number is sent from CPU 176 to local oscillator 174, too. Oscillator 174 sends a signal of a frequency representing the channel number to frequency converting circuit 172 so that the receiving system is ready for receiving the program of the corresponding channel transmitted from the satellite. If up-key 212 is continuously pushed, the displayed channel number of LED 180 is successively increased, and the oscillating frequency of local oscillator 174 correspondingly changes.

The satellite broadcasting receiving system has two operation modes: a storing mode for storing a specific channel transmitted from a broadcasting satellite and a viewing mode for reading and viewing the stored channel.

Figure 7:
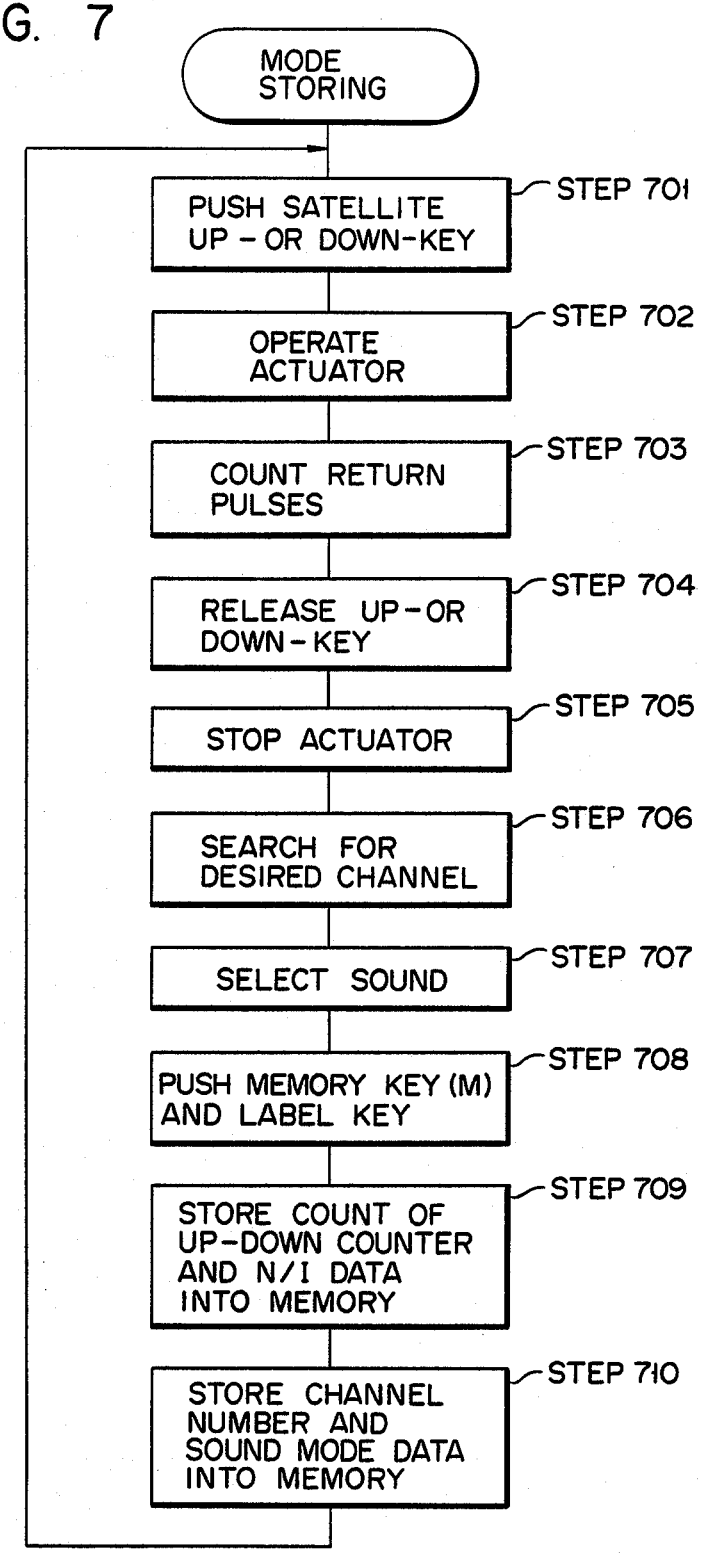
FIG. 7 shows a flowchart useful in explaining the storing operation mode of the satellite broadcasting receiving system shown in FIG. 1.

The storing mode will be given with reference to a flowchart shown in FIG. 7. As a first step, a normal or reverse satellite is selected by operating a normal/inverse select key (not shown) in operator section 136. Then, the up-key 208 (or down-key 210) in direction controlling part 168 is continuously pushed (step 701). Upon the pushing of the key, actuator 112 is operated (step 702) to increase (or decrease) the inclination of antenna 102. With this increase of the antenna inclination, a count of up-down counter 158 increases (decreases) so that a numerical value displayed by LED 162 for display of the number of pulses increases (or decreases) (step 703). During this process, signal meter 184 may greatly swing its pointer, and if the meter pointer is greatly swung, pushing of up-key 184 (or down-key 210) is stopped (step 704) to stop actuator 112 (step 705). When the meter pointer passes the point on the meter scale where the pointer greatly swings, the down-key 210 (or up-key 208) is pushed to move the pointer at that point. Then, the up-key 212 or the down-key 214 of channel controlling part 210 is pushed to select a channel to be stored (step 706). Then, for selecting a desired sound, the up- and down-keys 216 for sound channel selection in channel control part 170 are operated, and sound mode select keys 218 are operated for selecting a sound mode (step 707). Following these steps for the desired channel selection, the sound channel selection and the sound mode selection, the memory key (M) in label input part 166 shown in FIG. 6 is pushed, and then a desired label key (for example "1") out of 0 to 9 is selected and pushed (step 708). Upon depression of the label key, under control of CPU 176, the motor speed as is now displayed by LED 162 and the data of the normal/inverse switch are stored into nonvolatile memory 160 and attached with a label "1" (step 709). Further, the channel number as is now displayed by LED 180 for channel display, and the data on the sound channel selection and the sound mode as well are stored into nonvolatile memory 178 and also attached with label "1" (step 710). In this way, the sequence of the storing mode operations are completed.

Succeedingly, another channel may of course be stored. For storing another desired channel of the same satellite, none of the keys in the direction controlling part 168 are operated, and the up-key 212 or the down-key 214 in channel controlling part 170 is pushed to select the desired channel. Following the channel selection, the memory key (M) in label input part 166 is pushed, and a desired label key, for example, a "2" key, is pushed. Then, the number of rotations of the motor as is now displayed by LED 162 (equal to that attached with label "1"), and the data of the normal/inverse switch are stored into memory 160, with label "2" attached thereto. At the same time, the channel number as displayed by LED 180 at that time and the data on the sound selection as well as the sound mode are stored into memory 178, with label "2" attached thereto.

For storing a channel transmitted by another satellite, as in the previous case, the target satellite is selected, the normal/inverse mode is set up, a desired channel is selected, the sound and the sound mode are selected, and the memory key (M) of label input part 166 and another desired label key, for example, a "3" key, are pushed. These pieces of data are stored into memories 160 and 178, with a label (for example, "3") attached thereto.

The operation by related controls and the system operation of the satellite broadcasting receiving system will be given. When a viewer desires to view a program on a particular channel, he pushes the key with the label number (for example, "3") already programmed as described to correspond to the desired channel. Responsive to this key operation, CPU 164 reads out of nonvolatile memory 160 the number of pulses representing the number of rotations of the motor as set by that label number, causes LED 162 to display a numeral representing the number of rotations of the motor, and actuates relay 156 so that up-down counter 158 counts the number of pulses attached with that label number. The count of counter 158 corresponds to an inclination of parabolic antenna 102, i.e., the length of actuator rod 146 of actuator 112. Therefore, the fact that the label number is set in counter 158 indicates that antenna 102 is directed in the direction as required. Further, the normal/inverse data is read out of memory 160 and supplied to receiving polarization control section 138. By this section 138, the servomotor 130 for rotating antenna probe 126 of primary radiator 108 is controlled using the normal/inverse data.

When the label key (for example, "3") in label input part 166 is pushed, this data is sent to CPU 176 for channel tuning by way of CPU 164 for antenna control. CPU 176 reads out of memory 178 the channel number with the label number (e.g. "3"), displays it by LED 180, and controls local oscillator 174 so that its frequency is equal to that for the channel. Further, sound processing circuit 190 is controlled by the data on the sound selection and the sound mode as read out from memory 178. In this way, the viewer can view the desired program displayed by display unit 142.

Figure 8:
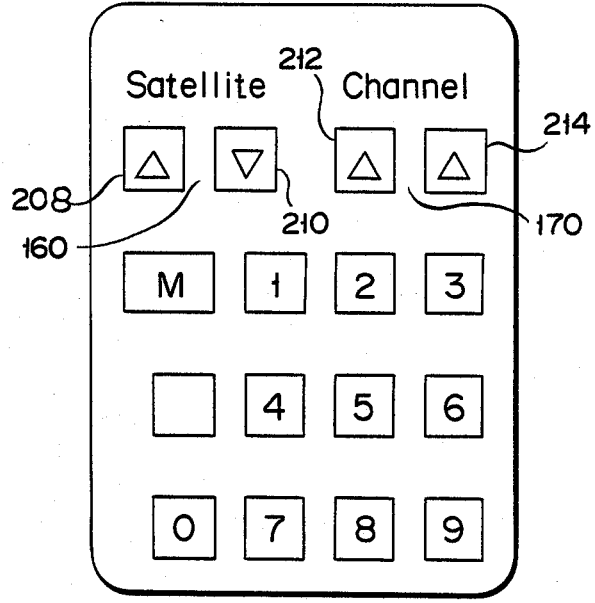
FIG. 8 shows a front view illustrating a front layout of a remote controller main frame used for an operator section of the IDU.

In the above-mentioned embodiment, operator section 136 is integral with IDU 118, as shown in FIGS. 4 and 6. However, it may be provided separately from the IDU, as shown in FIG. 8. In this case, a transmitter for the direction signals from operator section 136 by infrared rays is installed in remote control set 220. IDU 118 contains a receiver for receiving the signals from the transmitter. Remote control set 220 may fixedly be set on the front panel of IDU 118, if necessary. Use of such a remote control set enables the viewer to make an easy operation in the storing mode and the viewing mode.

It is preferable to automatically check if a target satellite is of the normal or inverse type. If so, the target satellite can be selected without any knowledge of the type of satellite. To this end, the receiving polarization control circuit 222 of the receiving polarization control section 138 as shown in FIG. 4 is constructed with two exclusive OR circuits 224 and 226, select switch 228 and holding circuit 230 as shown in FIG. 9. Supplied to control circuit 222 are the following three control signals from CPU 176 for channel tuning. The control signal is a channel select signal CS with "high" for odd channels and "low" for even channels, as shown in FIG. 10A. When channel controlling part 170 directs the frequency scanning of receiving waves for another channel detection, the first control signal indicates that CPU 176 is so selected as to successively receive 1 to 24 channels. The second control signal is a frequency scanning signal FS indicating that the frequency scanning for channel detection is performed, as shown in FIG. 10B. The third control signal is a select control signal SS for selecting a receiving state of the antenna, for example, a vertically or horizontally polarized wave, as shown in FIG. 10C. This signal changes its state, for example, from "high" to "low" before the second scanning is performed following the first scanning for all of the channels 1 to 24.

The channel select signal CS and the select control signal SS are input to select switch 228. The output signal of this switch 228 is input to the first input terminal of exclusive OR circuit 224. Input to the second input terminal of circuit 224 is a signal NI representing the type of satellite, which is derived from CPU 164 for antenna control. The output signal from circuit 224 is input to holding circuit 230. The frequency scanning signal FS is supplied to holding circuit 230 and CPU 164 for antenna control and further to select switch 228 for its switch control. The receiving polarization control signal HV as the output signal of holding circuit 230 as shown in FIG. 10D and the channel select signal CS are input to exclusive OR circuit 226. In circuit 226, the type of satellite is checked, and the result of the check is supplied as satellite type signal NI to CPU 164, as shown in FIG. 10E.

Figure 11:
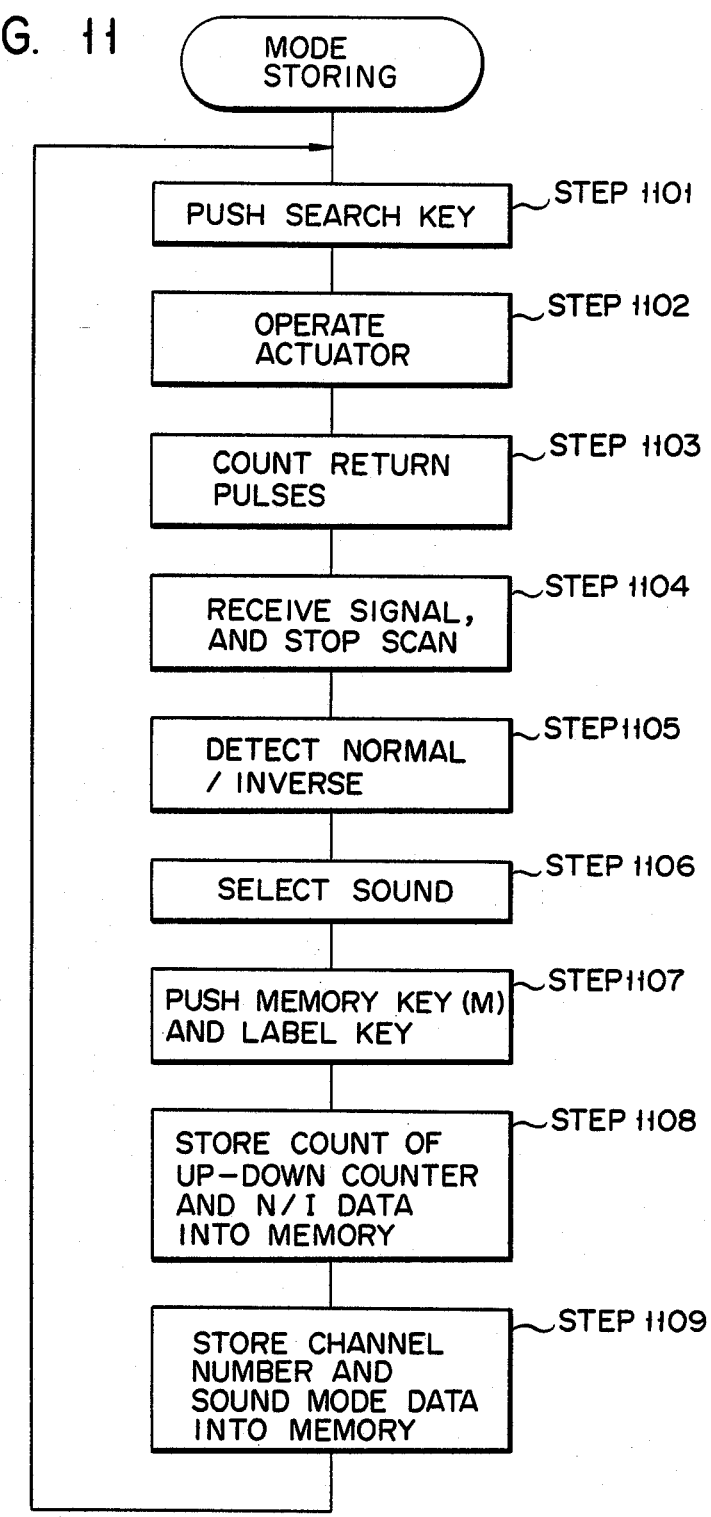
FIG. 11 shows a flowchart for explaining the storing operation mode of the satellite broadcasting receiving system using the FIG. 9 circuit.

The operation of the satellite broadcasting receiving system with the receiving polarization control circuit 222, of which the arrangement has been described referring to FIGS. 1 and 4, will be described. The storing mode will first be given using a flowchart shown in FIG. 11. Search key 232, which is contained in the channel controlling part 170 of operator section 136, is pushed for searching for a desired satellite (step 1101). Responsive to the pushing of search key 232, CPU 176 for channel tuning directs CPU 164 for antenna control to change the direction of parabolic antenna 176 in fine steps. CPU 164 applies a DC voltage of DC power supply 154 to DC motor 144 in actuator 112 to change the direction of parabolic antenna 102 (step 1102). The direction of antenna 102 is recognized by a count of up-down counter 158 (step 1103). Under this condition, CPU 176 sends a control signal to local oscillator 174, and then oscillator 174 supplies local oscillating signals necessary for successive reception of channels 1 to 24 from the satellite to frequency converting circuit 172. Display unit 142 reproduces channels 1 to 24 in a successive manner through frequency converting circuit 172, IF amplifier 182, FM demodulator 186, video processing circuit 188, and sound processing circuit 190. If antenna 102 is not directed to the target satellite, none of the channels are reproduced.

When search key 232 is pushed and the scanning of the receiving frequency for channel selection is performed, CPU 176 for channel tuning sends frequency scanning signal FS to receiving polarization control circuit 222 so that switch 228 is switched from the upper position to the lower position in FIG. 6. Switch control signal SS, as shown in FIG. 10C, supplied from CPU 176 is supplied to exclusive OR circuit 224 through select switch 228. The output signal of circuit 224 goes through holding circuit 230 and serves as receiving polarization control signal HV. Accordingly, when select control signal SS is "high", receiving polarization control signal HV goes "high", as shown in FIG. 10D. This state of signal HV represents that the receiver is conditioned for receiving the vertically polarized wave "V". When select control signal SS is "low", on the other hand, receiving polarization control signal HV takes a "low" state representing that the receiver is conditioned for a horizontally polarized wave "H". At the initial stage of the scanning for channel selection, a signal representing the vertically polarized wave "V", as receiving polarization control signal HV, is sent to motor 130 by way of cable 132. As a result, antenna probe 126 is rotated so that antenna 102 is ready for receiving the vertically polarized wave.

During the scanning for channel selection, if the satellite broadcasting is received, the pointer of signal meter 184 in signal processing section 120 of FIG. 4 swings. The signal at this time is sent to CPU 176 for channel tuning.

There is a case that after antenna 102 is ready for receiving vertically polarized wave "V" and the channels 1 to 24 are scanned for its selection in which no satellite broadcasting is received. In this case, select signal SS goes "low". Accordingly, the output signal of receiving polarization control circuit 222 also goes "low", that is, antenna 102 is ready for receiving horizontally polarized wave "H". Under this condition, the channels 1 to 24 are successively received. If the satellite broadcasting is not yet detected, CPU 176 for channel tuning sends a control signal to CPU 164 for antenna control to change the direction of antenna 102 at a minute angle on the geostationary satellite orbit. Under this condition, the frequency scanning for channel selection is repeated.

It is assumed now that when antenna 102 was turned toward a specific direction, all of the channels 1 to 24 were not received in a condition that the receiver is ready for vertically polarized wave "V", but channel 7 was received when it is ready for horizontally polarized wave "H". In this case, a detector by the output signal for IF amplifier 182 that the broadcasting is now performed causes CPU 176 for channel tuning to make "low" in signal state the frequency scanning signal FS to be sent to receiving polarization control circuit 222, as shown in FIG. 10B, thereby stopping the channel select scanning (step 1104).

Accordingly, channel select signal CS, as shown in FIG. 10A, keeps a "high" state representing that the stopped channel belongs to the odd channel. At this time, as described above, receiving polarization control signal HV is in a "low" state representing that the receiver is ready for the horizontally polarized wave "H". Therefore, the output of exclusive OR circuit 226 receiving these signals goes "high". Therefore, supplied to exclusive OR circuit 226 is a satellite type signal NI of "high" indicating that the satellite to which the antenna is directed is of the inverse type. In this way, the type of satellite is recognized (step 1105). The result of the satellite type recognition is indicated by an LED, for example.

The recognition of the type of satellite depends on the odd or even channel and the vertically or horizontally polarized wave of receiving waves, as shown in the following table:

| receiving channel | receiving polarized wave | |
|---|---|---|
|  | Vertically (high) | Horizontally (low) |
| odd channel (high) | Normal (low) | Inverse (high) |
| even channel (low) | Inverse (high) | Normal (low) |

In the above-mentioned embodiment, odd and even channels are respectively represented by "high" and "low" states of channel select signal CS. The vertically and horizontally polarized waves of receiving waves are represented by "high" and "low" states of receiving polarization signal HV. This is recognized by exclusive OR circuit 226 in such a way that when it is "high", the satellite is of the inverse type, and when it is "low", the satellite is of the normal type.

Signal NI for satellite type is sent to CPU 164 for antenna control and again input to exclusive OR circuit 224. That is, since the output of circuit 224 is "high", a "high" signal as the signal NI is input to exclusive OR circuit 224.

Select switch 228 is turned to the lower position in FIG. 9. As a result, the first input signal to circuit 224 serves as a channel select signal CS, and the output signal of circuit 224 goes "low". Until receiving this "low" signal (time t2), holding circuit 230 continuously produces a "low" signal since it receives as receiving polarization control signal HV. Thus, receiving polarization control circuit 222 continues the control of motor 130 so that antenna 102 can receive the horizontally polarized wave "H".

If a viewer desires to store this channel 7, following the sound channel selection and the sound mode (step 1106), the viewer pushes the memory key (M) and a desired label key of those 1 to 9, for example, of the key with label number 3 (step 1107), as in the above-mentioned embodiment. As a result, a count (for example, 65) of up-down counter 158 corresponding to the direction of antenna 102 and the signal NI (of "high") indicating that the satellite is an inverse satellite are stored into nonvolatile memory 160, with label number 3 attached thereto (step 1108). The channel number (07) at that time and the data on the sound selection and mode selection are stored into memory 178, with label number 3 attached thereto (step 1109).

If the viewer does not desire to store channel 7, he inputs it from channel controlling part 170, that is, pushes search key 232 of channel controlling part 170 to again scan channels 8 to 24. At this time, if a desired channel for storage is not found, he pushes the memory key (M) in label input part 166 and performs the operations as mentioned above. If the desired channel is not transmitted by the specific satellite, search key 232 in channel controlling part 170 is again pushed, antenna 102 direction is minutely changed and the receiving frequency scanning for channel selection is executed. In this way, storing operation of the desired channel is performed.

Figure 12:
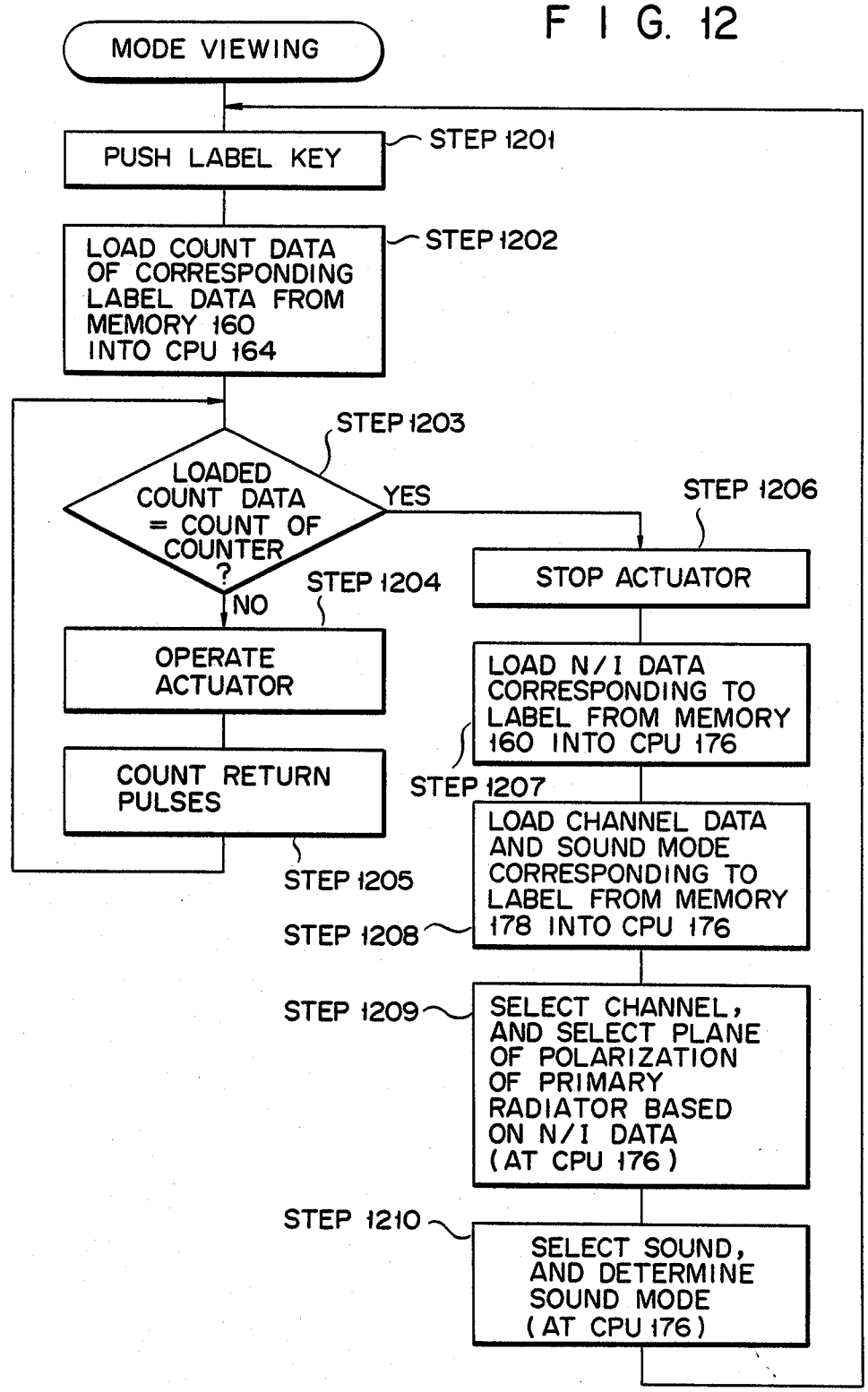
FIG. 12 shows a flowchart for explaining the viewing mode of the satellite broadcasting system using the FIG. 9 circuit.

The viewing mode will be described referring to FIG. 12. If the viewer desires to view the channel labeled as 3, he keys in 3 from label input part 166 (step 1201). Then, CPU 164 for antenna control reads out the count (65) attached with label number 3 from memory 160 (step 1202) and controls actuator 112 so that the count of up-down counter 158 reaches this value (steps 1203 to 1206). In this way, antenna 102 is directed toward a specific satellite.

In the next step, CPU 164 reads out from memory 160 a state that this satellite is an inverse satellite and supplies signal NI to receiving polarization control circuit 222 (step 1207). CPU 176 for channel tuning reads out from memory 178 the contents of label number 3, viz. "07" and the data on the sound channel selection and the sound mode (step 1208). CPU 176 for channel tuning controls local oscillator 174 so as to receive the channel 7 and supplies the channel select signal to receiving polarization control circuit 222. As a result, receiving polarization control circuit 222 sends receiving polarization control signal HV of "low" to motor 130, and antenna 102 is ready for receiving the horizontally polarized wave "H" (step 1209). CPU 176 performs the sound channel selection and selects a sound mode (step 1210). Through the sequence of the above operations, the receiver is ready for receiving the channel 7 from the inverse satellite.

In the embodiment as mentioned above, LED 162 for display of the number of pulses is used for indicating the count of up-down counter 158 corresponding to the direction of the antenna 102. If necessary an input label number, e.g. 3, may be displayed by this LED.

Further, for recognizing the type of satellite, the above embodiment employs the special receiving polarization control circuit. The satellite type recognition may be executed by CPU 164 for antenna control. This recognition by the CPU will be given referring to a flowchart of FIG. 13 and timing waveforms of FIGS. 14A to 14F.

At time $t_{11}$, channel select signal CS has gone "high", as shown in FIG. 14A so that receiving polarization control signal HV goes "high", as shown in FIG. 14D. When search key 232 is pushed at time $t_{12}$, frequency scanning signal FS goes "high" as shown in FIG. 14B. Under this condition, the receiving frequencies are scanned while the direction of the antenna is gradually changed. At this time, if FS flag is "low", as shown in FIG. 14F, the FS flag goes "high" through steps 1301 and 1302, as shown in FIG. 14F. Since frequency scanning signal FS has gone "high", select control signal SS is checked through steps 1303 and 1304 in FIG. 13. As shown in FIG. 14C, select control signal SS is "high" until time $t_{13}$, and satellite type signal NI is "low" until that time, as shown in FIG. 14E. Accordingly, receiving polarization control signal HV keeps the "high" state until this time point, as shown in FIG. 14D, through steps 1305 and 1306 in FIG. 13. At time $t_{13}$, select control signal SS goes "low" as shown in FIG. 14C. As a result, receiving polarization control signal HV goes "low" at time $t_{14}$, as shown in FIG. 14D, through steps 1307 and 1308 in FIG. 13.

It is assumed now that for the vertically polarized wave, none of channels 1 to 24 are detected, but for the horizontally polarized wave, channel 5 is detected at time $t_{15}$. In this case, the receiving frequency scanning is stopped, and the frequency scanning signal FS goes "low" as shown in FIG. 14B. Further, since the odd channel is detected, channel select signal CS goes "high" as shown in FIG. 14A. At this time, since the horizontally polarized wave is received, receiving polarization control signal HV is "low" as shown in FIG. 14D. Accordingly, through steps 1309 to 1311 in FIG. 13, satellite type signal NI goes "high" at time $t_{16}$, as shown in FIG. 14E. Subsequently, at time $t_{17}$, the FS flag goes "low" as shown in FIG. 14F. At this time point, the satellite is recognized as an inverse satellite. After the FS flag goes "low", through step 1301, with the "low" state of frequency scanning signal FS, receiving polarization control signal HV is determined according to channel select signal CS and satellite type signal NI.

In the viewing mode, when a desired channel is an even channel (time $t_{18}$), if signal NI is "high", receiving polarization control signal HV goes "high" at time $t_{19}$, as shown in FIG. 14D, through steps 1312 and 1313 in FIG. 13. That is, antenna 102 is ready for receiving a vertically polarized wave "V".

The receiving polarization control circuit of FIG. 9 may be replaced by a circuit 234 of FIG. 15. In this circuit 234, polarization control signal DS is used in place of select control signal SS. The polarization control signal DS and channel select signal CS, as issued from CPU 176 for channel tuning, are input to exclusive OR circuit 236 for recognizing the type of satellite. The output signal of circuit 236 is sent, as satellite type signal NI, to CPU 164 for antenna control. The signal NI and channel select signal CS as output from CPU 164 for antenna control are input to another exclusive OR circuit 238. The output signal of circuit 238 is input to the first input terminal of select switch 240. Polarization control signal DS is input to the second input terminal of switch 240. The frequency scanning signal FS output from CPU 176 for channel tuning is supplied to CPU 164 for channel control, and switch 240 is controlled by the output signal from delay 242.

As described above, when search key 232 of channel controlling part 170 is pushed, frequency scanning signal FS goes "high" as shown in FIG. 16B, and the scanning of receiving frequencies starts. Normally, switch 240 is turned to the lower side as shown in FIG. 15. When signal FS goes "high", it is turned to the upper side, and polarization control signal DS is output to antenna 102 in the form of the output signal of receiving polarization control circuit 234.

When polarization control signal DS goes "high" and receiving polarization control signal HV goes "high", as shown in FIGS. 16C and 16D, the receiver is ready for receiving the vertically polarized wave, and all of the channels 1 to 24 are scanned. Then, when both signals DS and HV go "low", it is ready for receiving the horizontally polarized wave. Under this condition, if the channel 4 is received, frequency scanning signal FS goes "low" at time $t_{21}$, as shown in FIG. 16B. At this time, since channel select signal CS and polarization control signal DS are "low" as shown in FIGS. 16A and 16C, exclusive OR circuit 236 outputs the "low" signal (indicating the normal satellite) as satellite type signal NI to CPU 164 for antenna control at time $t_{21}$, as shown in FIG. 16E.

During the frequency scanning, the satellite type signal NI supplied from CPU 164 to exclusive OR circuit 238 keeps an undefined state, i.e. "high" or "low" state. When the signal NI is produced as the output signal from exclusive OR circuit 236, this value is transferred to exclusive OR circuit 238. At time point $t_{22}$ following time point $t_{21}$ when frequency scanning signal FS goes "low", select switch 240 is again turned to the lower side. At this time, as the output signal of exclusive OR circuit 238, an appropriate polarization has been determined using channel select signal CS and satellite type signal NI. The "low" signal is transferred as the receiving polarization control signal to antenna 102.

Also in this case, as in the previous embodiment, through CPU 164, signal NI, together with the count corresponding to the satellite direction, is stored into memory 160 with a predetermined label number attached thereto. A desired channel is also stored into memory 178 with the equal label number attached thereto. In the viewing mode, the label number is designated, and the desired channel is reproduced.

In the above-mentioned embodiments, two memories are used for storing the count corresponding to the antenna direction, the satellite type signal NI, and a desired channel, respectively. It is evident that these pieces of data may be stored into a single memory, with a specific label attached thereto. Further, the type of memory is not limited to a nonvolatile type.

In the above-mentioned embodiments the amplitude of the output signal of IF amplifier 182 is used for detecting the presence of satellite broadcasting. Alternatively, this can be detected by detection of a sync signal from a sync separation circuit (not shown) of video processing circuit 188.

Further, while the TV signal of each channel contains both the visual and aural signals, it may contain only an aural signal. In this case, a speaker system is used in place of the display unit.

It is needless to say that the label numbers may be substituted by alphabetic letters, such as A, B, C, etc., or by the combination of alphabetic letters and numbers, such as A1, F3, G4, etc.

Since the nonvolatile memories are used for data storing, data is not volatilized if the power supply is turned off; therefore, after power on, it may be set in the viewing mode.

What is claimed is:

1. A satellite broadcasting receiving system for receiving broadcasting waves from a plurality of satellites arranged on a geostationary satellite orbit for broadcasting purposes, each of said satellites broadcasting a plurality of channels, said receiving system comprising:
   a parabolic antenna capable of changing its receiving state so as to receive horizontally and vertically polarized broadcasting waves from said satellites;
   means for adjusting the direction of the antenna so as to receive the broadcasting waves from a specific satellite;
   means for reproducing a signal of a specific channel of a plurality of channels from the specific satellite as received by said antenna;
   memory means for storing the position data of the satellite corresponding to the specific direction of said antenna and channel selection data corresponding to the reproduced signal;

operating means including a selecting section for selecting the direction of said antenna and for selecting the channel, a requesting section for requesting the storage of the position of the specific satellite and the channel selection data to said memory means, and a label input section for assigning a label to the stored data for recognizing the channel of the specific satellite and for requesting that channel;

control means for storing the data representing the position of said specific satellite and the channel selection data into said memory means with said label when said label is input in response to a storage request by said requesting section of said operating means, and for reading out of said memory means said stored data for controlling said antenna, said direction adjusting means and said reproducing means when said label is input without a storage request, wherein said antenna direction adjusting means changes the direction of said antenna under control of said control means according to the selection of the antenna direction, which is derived from said operating means, and generates pulses with the change of antenna direction, an accumulated value of pulses being counted by counting means under control of said control means according to said selection of antenna direction, the satellite position data stored into said memory means being the accumulated value of the pulses counted by said counter, said control means readin out of said memory means the accumulated value of pulses stored with said label when said label is input without a storage request and controlling said antenna direction adjusting means so that said read out pulse accumulated value is equal to a count of said counting means; and receiving polarization control means for controlling the receiving state of said antenna, said control means storing the receiving state of said antenna into said memory means, reading out of said memory means the antenna receiving state and its label when said label is input from said operating means without a storage request, and causing said receiving polarization control means to control the receiving state of said antenna so that it is coincident with said read out antenna receiving state.

2. A satellite broadcasting receiving system according to claim 1, wherein said selecting section of said operating means successively searches the channels of a receivable satellite according to a search request, and wherein said control means, according to said search request:

gradually changes the direction of said antenna, controls the scanning of the receiving frequency so that said reproducing means receives each channel when said antenna is fixed in a fixed direction, said receiving frequency scanning being performed such that each channel is received in receiving states allowing said antenna to receive the horizontally and vertically polarized waves, stops the direction changing operation of said antenna when a signal is received through said receiving frequency scanning, checks if the received signal belongs to an even or odd group of channels, causes said receiving polarization control means to recognize, based on both the receiving state and the channel condition the type of satellite existing in the direction in which said antenna faces, stores into said memory means data representing the type of detected satellite and the direction of said antenna, reads out of said memory means the corresponding contents along with said label when said label is input without said storage request from said operating means, controls said antenna direction adjusting means so as to receive a desired channel by directing said antenna toward the specific satellite, and causes said receiving polarization control means to control said antenna so as to have a receiving state capable of receiving given horizontally and vertically polarized waves.

3. A satellite broadcasting receiving system according to claim 2, wherein said receiving polarization control means recognizes the satellite as a normal satellite using the horizontally polarized wave for the even channels and the vertically polarized wave for the odd channels when said channel is an even channel and the receiving state of said antenna is for horizontally polarized wave reception or when said channel is an odd channel and the receiving state of said antenna is for vertically polarized wave reception, and wherein said receiving polarization control means further recognizes the satellite as an inverse satellite using the vertically polarized wave for the even channels and the horizontally polarized wave for the odd channels when said channel is an even channel and the receiving state of said antenna is for vertically polarized wave reception or when said channel is an odd channel and the receiving state of said antenna is for horizontally polarized wave reception.

4. A satellite broadcasting receiving system according to claim 3, wherein said receiving polarization control means includes a receiving polarization control circuit comprising:

a first exclusive OR circuit for receiving at a first input terminal a satellite type signal representing a type of the satellite from said control means;

a channel selection switch for allowing a channel selection signal to go from said control means to a second input terminal of said first exclusive OR circuit, said channel selection signal taking a high or low state according to the even or odd channel during said frequency scanning and keeping its state when a signal is received by said frequency scanning, said channel selection switch allowing a channel selection signal for selecting the receiving state of said antenna to go from said control means to said second input terminal of said first exclusive OR circuit when said frequency scanning is not performed;

a holding circuit for holding the output signal of said first exclusive OR circuit and outputting a receiving polarization control signal for controlling the receiving state of said antenna; and a second exclusive OR circuit for receiving said receiving polarization control signal and said channel selection signal and for outputting said satellite type signal to said control means.

5. A satellite broadcasting receiving system according to claim 4, wherein said memory means is a nonvolatile memory.

6. A satellite broadcasting receiving system according to claim 5, wherein said operating means includes a transmitter for transmitting a signal responsive to each operation of said operating means, and said control means performs the control according to a signal from a receiver which receives the signals from said transmitter.

7. A satellite broadcasting receiving system according to claim 3, wherein said receiving polarization control means is obtained in said control means.

8. A satellite broadcasting receiving system according to claim 7, wherein said memory means is a nonvolatile memory.

9. A satellite broadcasting receiving system according to claim 8, wherein said operating means includes a transmitter for transmitting a signal responsive to each operation of said operating means, and said control means performs the control according to a signal from a receiver which receives the signals from said transmitter.

10. A satellite broadcasting receiving system according to claim 3, wherein said receiving polarization control means includes
a first exclusive OR circuit for receiving as its inputs a channel select signal from said control means and a polarization control signal, said channel select signal taking a "high" or "low" state according to the even or odd channel when the scanning of said receiving frequency is performed, and keeping its state when a signal is received by said frequency scanning, said polarization control signal taking a "high" state until scanning of all of the channels are completed during said receiving frequency scanning, and taking a "low" state after the scanning of all of the channels is completed, said first exclusive OR circuit producing the output signal as the satellite type signal representing the type of satellite to said control means;
a second exclusive OR circuit for receiving as its inputs said satellite type signal and said channel select signal; and
a select switch for providing, as the receiving polarization control signal for controlling the receiving state of said antenna, the output signal from said second exclusive OR circuit until a predetermined time is elapsed after a signal is received by said receiving signal scanning, and providing said polarization control signal after said predetermined time.

11. A satellite broadcasting receiving system according to claim 10, wherein said select switch is switched according to a frequency scanning signal representing that said receiving frequency scanning is performed, said frequency scanning signal being derived from said control means and delayed a predetermined period of time.

12. A satellite broadcasting receiving system according to claim 11, wherein said memory means is a nonvolatile memory.

13. A satellite broadcasting receiving system according to claim 12, wherein said operating means includes a transmitter for transmitting a signal responsive to each operation of said operating means, and said control means performs the control according to a signal from a receiver which receives the signals from said transmitter.

14. A satellite broadcasting receiving system for receiving broadcasting waves from a plurality of satellites arranged on a geostationary satellite orbit for broadcasting purposes, each of said satellites broadcasting a plurality of channels, said receiving system comprising:
a parabolic antenna adjustable in direction and signal receiving state so as to selectively receive a horizontally or vertically polarized wave;
means for gradually adjusting the antenna direction;
means for scanning receiving frequencies to receive each channel whenever said parabolic antenna is adjusted in direction;
means for stopping the gradual adjustment of said parabolic antenna to fix its direction when a signal is received by said frequency scanning;
means for checking if the received signal belongs to an even or odd group of the channels;
means for detecting, based on information indicating that the received signal belongs to the even or odd group of the channels and that the signal receiving state of said antenna is a horizontally or vertically polarized wave receiving state, the type of a satellite present in the direction in which said antenna is oriented;
means for storing the data representing the detected satellite type, the direction of said antenna when the satellite type is detected, and a desired channel transmitted from the satellite, said data being stored with a predetermined label attached thereto; and
control means for reading out, by specifying said predetermined label, the corresponding data from said storing means, said corresponding data being used for controlling said antenna in the direction of a specific broadcasting satellite so as to receive the desired channel and for controlling said antenna so as to place it in a signal receiving state for receiving the horizontally or vertically polarized wave.

15. A satellite broadcasting receiving system according to claim 14, wherein said detecting means recognizes the satellite as a normal satellite using the horizontally polarized wave for the even channels and the vertically polarized wave for the odd channels when said channel is an even channel and the receiving state of said antenna is for horizontally polarized wave reception or when said channel is an odd channel and the receiving state of said antenna is for vertically polarized wave reception, and wherein said detecting means further recognizes the satellite as an inverse satellite using the vertically polarized wave for the even channels and the horizontally polarized wave for the odd channels when said channel is an even channel and the receiving state of said antenna is for vertically polarized wave reception or when said channel is an odd channel and the receiving state of said antenna is for horizontally polarized wave reception, said control means controlling said antenna so as to have a receiving state capable of receiving given horizontally and vertically polarized waves according to the data identifying the type of the satellite and a desired receiving channel.

* * * * *